United States Patent
Lim et al.

(10) Patent No.: US 6,569,476 B2
(45) Date of Patent: May 27, 2003

(54) PRODUCTION OF HYDROLYSATE SEASONING

(75) Inventors: Bee Gim Lim, Singapore (SG); Thang Ho Dac, Le Mont S/Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/727,444

(22) Filed: Dec. 4, 2000

(65) Prior Publication Data

US 2001/0003593 A1 Jun. 14, 2001

(30) Foreign Application Priority Data

Dec. 2, 1999 (SG) ............................. 9906087

(51) Int. Cl.⁷ ............................. A23L 1/23; A23J 3/16; A23J 3/34
(52) U.S. Cl. ........................ 426/46; 426/52; 426/533; 426/656
(58) Field of Search ............................. 426/46, 18, 56, 426/52, 618, 634, 574, 656, 533; 435/68.1

(56) References Cited

U.S. PATENT DOCUMENTS

| | | | | |
|---|---|---|---|---|
| 3,852,479 A | * | 12/1974 | Yokotsuka et al. | 426/44 |
| 3,912,822 A | * | 10/1975 | Yokotsuka et al. | 426/44 |
| 3,937,843 A | * | 2/1976 | Osaka et al. | 426/46 |
| RE28,810 E | * | 5/1976 | Tsumura et al. | 426/46 |
| 4,308,284 A | * | 12/1981 | Noda et al. | 426/7 |
| 4,587,127 A | * | 5/1986 | Akao et al. | 426/46 |
| 4,595,594 A | * | 6/1986 | Lee et al. | 426/35 |
| 5,141,756 A | * | 8/1992 | Bajracharya et al. | 426/46 |
| 5,316,776 A | * | 5/1994 | Annuk et al. | 426/18 |
| 5,863,573 A | * | 1/1999 | Dambmann et al. | 426/36 |
| 6,024,990 A | * | 2/2000 | Baensch et al. | 426/44 |
| 6,054,151 A | * | 4/2000 | Kwon et al. | 426/36 |
| 6,383,532 B1 | * | 5/2002 | Lim et al. | 426/52 |

FOREIGN PATENT DOCUMENTS

| | | |
|---|---|---|
| EP | 0 640 294 | 3/1995 |
| EP | 0 824 873 | 1/1998 |
| EP | 0 829 205 | 3/1998 |
| EP | 0 913 097 | 5/1999 |
| JP | 59-14766 | * 1/1984 |

* cited by examiner

Primary Examiner—Keith Hendricks
(74) Attorney, Agent, or Firm—Winston & Strawn

(57) ABSTRACT

A process for producing a hydrolysate seasoning by hydrolyzing a protein containing material with enzymes that have proteolytic activity and fiber hydrolyzing activity. The hydrolysate may be used as a liquid sauce, a paste, or as a dried powder. The hydrolysate may be used as a base for an aromatisation agent in culinary products.

23 Claims, No Drawings

PRODUCTION OF HYDROLYSATE SEASONING

FIELD OF THE INVENTION

The present invention relates to a process for producing a hydrolysate seasoning. In particular to a process for preparing a hydrolysate seasoning by the biological hydrolysis of a protein containing material.

BACKGROUND OF THE INVENTION

Co-pending application EP-A-0824873 describes a process for producing a seasoning by preparing a fermented protein koji from a protein containing material and a carbohydrate and hydrolyzing the fermented protein koji at a temperature between 15° C. and 60° C., a pH of from 4.5 to 10, for a period of 6 hours to 28 days. The process is characterized by inoculating the protein containing material and carbohydrate with a culture of a lactic acid bacteria at an inoculation density of from $10^3$ to $10^7$ cfu/g of fermented protein koji either at the fermented protein koji stage or at the hydrolysis stage. The lactic acid bacteria inhibits the growth of contaminating bacteria and protects the koji from abnormal fermentation and putrefaction that is caused by the contaminating bacteria.

Some lactic acid bacteria, e.g. *Lactobacillus sake* (*L. sake*), produce peptidases and fiber hydrolysing enzymes. An APIZYM kit has been used to demonstrate that lactic acid bacteria have enzymatic activity such as phosphatase, lipase, aminopeptidase (leucyl-, valyl-, cystyl-), protease (chymotrypsin) and carbohydrase (galactosidase, glucosidase, N-acetyl-β-glucosaminidase) activity. Lactic acid bacteria, however do not produce glutaminase activity extracelluarly. Among the carbohydrases that are produced is N-acetyl-β-glucosaminidase, a fiber hydrolysing enzyme. The substrate of this enzyme, N-acetyl-β-glucosamine, is commonly found in chitin. Therefore, these lactic acid bacteria produce chitinase that is capable of degrading the polysaccharide chains of fungal cell walls. When API 50 CHL is used to characterize the lactic acid bacteria, it can be shown that they are able to break down mannose, rhamnose, N-acetyl-β-glucosamine, melibiose, saccharose, trehalose, β-gentiobiose, and gluconate. Each of these are carbohydrates are commonly found in plant cell walls. Among the enzymes produced by lactic acid bacteria is gluconase which is also a fungal cell wall degrading enzyme.

These properties make lactic acid bacteria a valuable source of proteolytic and fiber hydrolyzing enzymes, in addition to its ability to protect against abnormal fermentation and putrefaction.

SUMMARY OF THE INVENTION

The invention is directed to a process for producing a hydrolysate seasoning. The process involves providing an aqueous solution of one or more protein containing materials and hydrolyzing the one or more plant protein containing materials in the presence of one or more enzymes that have proteolytic activity and one or more enzymes that have fiber hydrolyzing activity to provide the hydrolysate seasoning. Preferably, the protein containing material contains about 30 to 100 percent protein. The protein containing material may be one or more of soya, wheat germ, corn gluten, rice gluten, or wheat gluten.

In another embodiment the one or more protein containing materials is a fermented protein koji prepared from the one or more protein containing materials and a carbohydrate. Hydrolysis of the fermented protein koji may be carried out at a temperature of about 15° C. to 37° C. for about 12 hr to 5 days or at a temperature of about 37° C. to 55° C. for a about 8 hr to 2 days. The fermented protein koji may be prepared by fermenting one or more protein containing materials and a carbohydrate with a culture comprising one or more of *Aspergillus oryzae* and *Aspergillus sojae*. The koji may also be inoculated with a culture of a lactic acid bacteria at an inoculation density of from $10^3$ to $10^9$ cfu/g of protein containing material either before the koji is fermented or before the koji is hydrolyzed.

The one or more enzymes that have proteolytic activity may be obtained from bacteria, fungi, or yeast. The one or more enzymes that have proteolytic activity may be one or more of a proteolytic enzyme produced during a koji fermentation, a proteolytic enzyme produced by lactic acid bacteria that has been inoculated into the plant protein material, or a technical proteolytic enzyme.

The one or more enzymes having fiber hydrolyzing activity may be obtained from bacteria, fungi, or yeast. The one or more enzymes containing fiber hydrolyzing activity may be one or more of a fiber hydrolyzing enzyme produced during a koji fermentation, a fiber hydrolyzing enzyme produced by lactic acid bacteria that has been inoculated into the protein material, or a technical fiber hydrolyzing enzyme.

When the one or more protein containing materials is a koji, the one or more enzymes having proteolytic activity or the one or more enzymes having fiber hydrolyzing activity may be added to the plant protein containing materials before the koji is fermented.

The hydrolysis of the protein containing material may be carried out in the presence of salt in an amount of up to 100% by weight based on the weight of the protein material.

The process may further include the step of pressing the hydrolysate seasoning to separate a liquid hydrolysate seasoning from a solid residue. The liquid hydrolysate seasoning may be pasteurized at a temperature of about 90° to 140° C. for a period of about 15 seconds to 30 minutes and then filtered. When the hydrolysis is carried out in the absence of salt, salt may be added before pressing or after pressing to provide a liquid hydrolysate seasoning having a salt content of less than 60% by weight based on the weight of dry matter. The process may further include the step of concentrating the liquid hydrolysate seasoning to provide a concentrated hydrolysate seasoning, drying the concentrated hydrolysate seasoning to provide a dried hydrolysate seasoning, and milling the dried hydrolysate seasoning into a powder to give a solid hydrolysate seasoning, wherein the solid hydrolysate seasoning has a water content of less than about 2 percent.

The process may also include the step of inoculating the protein containing material with a lactic acid bacteria selected from the group consisting of *L. sake, L. brevis, L. casei, L. curvatus, L. pentosus, L. plantarum, L. pentosaceus,* and mixtures thereof.

DETAILED DESCRIPTION OF THE PREFERRED EMBODIMENTS

The present invention provides a process for producing a hydrolysate seasoning that comprises hydrolyzing a protein containing material with enzymes having proteolytic activity and fiber hydrolyzing activity. We have surprisingly found that there is an improvement in the organoleptic properties of the seasoning when the hydrolysate seasoning is produced by hydrolyzing a protein containing material with enzymes that have proteolytic activity and fiber hydrolyzing activity. This improvement may be achieved with or without the preparation of koji and/or in the presence or absence of lactic acid bacteria.

The phrase "hydrolysate seasoning," as used herein means is a flavoring or seasoning prepared by hydrolyzing proteins.

The phrase "proteolytic activity," as used herein means enzymatic activity that leads to the hydrolysis of peptide bonds.

The phrase "fiber hydrolyzing activity," as used herein means enzymatic activity that breaks down fiber material such as cellulose and glucans.

The phrase "koji," as used herein means a mixture of plant proteins and carbohydrates that are combined with an Aspergilli culture to ferment the mixture.

The protein containing material used as the substrate typically contains from about 30 to 100% of protein, preferably from about 70 to 90% of protein.

The protein containing material may be a plant protein material including, but not limited to soya, wheat germ, corn gluten, rice gluten, wheat gluten, and the like or it may be a fermented protein koji prepared from the protein containing material and a carbohydrate. The fermented protein koji may be prepared, for example, by fermenting one or more protein containing materials together with a carbohydrate with a culture of Aspergillus oryzae and/or Aspergillus sojae. The carbohydrate may be, for example, wheat flour, roasted wheat, or wheat bran.

When the protein containing material is a gluten that will undergo a koji fermentation, it is advantageously used as a substrate in the form of pellets. The pellets may be prepared by adding water to a dried gluten to provide a dough that has a water content of about 19 to 60% by weight of the dough, pelletizing the dough and, if necessary, adding water to adjust the moisture content to about 35 to 60% by weight of the pellets, and then sterilizing the pellets by steam treatment. The preparation of the pellets as a substrate for Koji fermentation from the above raw materials and the conditions for koji fermentation are described in our copending application SG-A-9800488-0.

If desired, the protein containing material may be inoculated with a lactic acid bacteria for protective purposes. The lactic acid bacteria may be, for instance, L. sake, L. brevis, L. casei, L. curvatus, L. pentosus, L. plantarum, L. pentosaceus.

The source of the enzyme having proteolytic activity may be microorganisms such as bacteria, fungi, yeasts, and the like. For example, the enzyme may be an enzyme produced during koji fermentation, a proteolytic enzyme produced by lactic acid bacteria used to inoculate the protein material, a technical proteolytic enzyme, or a combination of two or more of these enzymes. The technical enzyme may be, for example, a protease, peptidase, or glutaminase (e.g. Alcalase and Flavorzyme commercially available from Novo Nordisk and Glutaminase commercially available from Amano Pte Ltd.). The term "technical enzymes," as used herein means enzymes that have been isolated and purified to remove interfering activities which would be detrimental to processing. The technical enzymes containing proteolytic activity may be added to the plant protein prior to koji fermentation or it may be added to the hydrolysate.

The source of the enzyme containing fiber hydrolyzing activities may be microorganisms such as bacteria, fungi, yeasts, and the like. For example it may be the small amount of fiber hydrolyzing enzyme produced during koji fermentation, the fiber hydrolyzing enzymes produced by the lactic acid bacteria used to inoculate the protein material, a technical fiber hydrolyzing enzyme, or a combination of two or more of these enzymes. The technical fiber hydrolyzing enzyme may be, for instance, Hemicellulase (commercially available from Amano Pte Ltd.), Celluclast (commercially available from Novo Nordisk), or Depol 40L (commercially available from Biocatalyst Pte Ltd.). The enzyme containing fiber hydrolyzing activity may be added to the plant protein substrate prior to koji fermentation, or it may be added to the hydrolysate.

Among the protein substrates, corn gluten shows the most significant improvement in the hydrolysis yield by using an enzyme that possesses fiber hydrolyzing activity. Corn gluten contains a high percentage of carbohydrates (16.5%) and fibers (5.7%). These complex carbohydrates form an intact membrane and the corn proteins are found within this membrane. The carbohydrate network greatly reduces the exposure of the corn protein to proteases or peptidases. Therefore, it is necessary to break down the carbohydrate membrane by fiber hydrolyzing enzymes to increase the exposure of the corn protein to proteases or peptidases.

Without wishing to be bound by theory, for the koji system, it is thought that the fiber hydrolyzing enzymes hydrolyze the cell walls of the Aspergillus mycelia in the koji and cause intracellular koji peptidases and glutaminases to be released into the hydrolysate. These extracellular peptidases and glutaminases are more efficient and result in increase in the yields of formol nitrogen, and glutamic acid.

Hydrolysis of the protein containing material may be carried out at a temperature from about 20 to 65° C., at a pH from about 4.5 to 10, and for a period of from about 6 hours to 28 days, for example as described in EP 0640294 or our co-pending patent applications EP-A-0829205, EP-A-0824873, and EP-A-09 13097, the entirety of which are hereby incorporated by reference. In EP-A-0824873 and EP-A-09 13097 inoculation of the koji with a culture of a lactic acid bacteria at an inoculation density of from $10^3$ to $10^7$ cfu/g of fermented protein koji is carried out either at the fermented protein koji stage or at the hydrolysis stage. In the present invention, inoculation of the protein containing material with a culture of a lactic acid bacteria at an inoculation density of from $10^3$ to $10^9$ cfu/g of protein containing material may be carried out either at the fermented protein koji stage or at the hydrolysis stage. The hydrolysis is preferably carried out at a temperature between about 15° C. and 37° C. for a period of from about 8 hr to 5 days, and more preferably at a temperature between about 37° C. and 55° C. for a period of from 8 hr to 2 days. Advantageously, the hydrolysis is carried out at a pH of from about 4.5 to 7.5. The hydrolysis may be carried out in the absence or presence of salt. When salt is present, the amount of salt may be up to 100% by weight based on the weight of the protein material. The amount of water present during hydrolysis is not critical and may be from about 20 to 65 percent, preferably about 35 to 55 percent water, for example. The amount of protein containing material is typically from about 24 to 98 percent by weight of the dry matter.

After hydrolysis, the hydrolyzed protein material may be pressed to separate a liquid sauce from a solid residue. The liquid sauce is advantageously pasteurized, for example, at a temperature of from about 90° to 140° C. for a period of from about 15 seconds to 30 minutes and then filtered to give a liquid seasoning. If desired, salt may be added either before or after pressing or filtering to give a product having a salt content of about 0 to 60% by weight based on the weight of dried matter. If desired, the liquid sauce may be made into a powder, for instance, by concentration and drying. For example, the liquid sauce may be vacuum dried to a low moisture content and then milled into a powder to give a solid seasoning. The resulting hydrolysate may be used as a base for an aromatisation agent in culinary products.

EXAMPLES

The invention is further defined by reference to the following examples describing in detail the preparation of the hydrolysate seasoning of the present invention, as well as their utility. The examples are representative, and they should not be construed to limit the scope of the invention.

Example 1

Water was added directly to a mixture of corn gluten (6.04 kg), wheat flour (2.16 kg), and wheat bran (0.43 kg) to provide a dough having a moisture content of 45%. The resulting dough was fed into a mincer to form cylindrical pellets each having a diameter of 4 mm and a length of 10 mm. Additional moisture was introduced into the pellets such that the moisture content of the pellets was 47% by weight.

The pellets were heated to 100° C., held at this temperature for 10 minutes and, cooled to below 40° C. The cooked extrudates were mixed with a liquid suspension of 2.5 g of *Aspergillus olyzae* spores inoculum and 10 g of a culture of *L. sake* at $10^9$ cfu/g. The technical hemicellulase enzyme, Hemicellulase (activity=90,000 μ/g) (commercially available from Amano Pte Ltd.) was added at a concentration of 0.43% by weight of the cooked extrudate.

The koji was fermented for 42 hours. The following temperature profile was maintained for the culture bed:

| | |
|---|---|
| 0–25 hours | 30° C. |
| 25–42 hours | 27° C. |

The Koji was mixed at $18^{th}$ and $25^{th}$ hours to ensure sufficient airflow through the culture bed for good ventilation. After koji fermentation, the matured koji was harvested and hydrolyzed. Hydrolysis was carried out in a hydrolysis tank by adding water to obtain a hydrolysate with a total solid of 18% w/w. The hydrolysis was carried out at 35° C. for 48 hours and the pH was kept constant at a value of 6.0 by addition of 40% NaOH solution.

The corn gluten hydrolyzed product had a high glutamic acid content of 1.01% w/w. The hydrolyzed product was pressed to separate corn gluten sauce from the solid residue. Salt was added to the level of 15% w/w before pressing. The corn gluten sauce was heat treated at 90° C. for 20 minutes. The liquid sauce was concentrated by evaporation to provide a concentrate and the concentrate was dried in a vacuum oven and milled into powder.

For organoleptic evaluation, 12.5 g of liquid sauce or 3.5 g of powder were diluted with 250 ml of boiling water. In both cases, a tasting panel of 8 experienced tasters found the product to have a better body than a product prepared without adding the technical hemicellulase enzyme to the cooked extrudates.

Example 2

A procedure similar to that carried out in example 1 was followed except that technical hemicellulase enzyme was added to the hydrolysate at a concentration of 0.25% by weight of the hydrolysate during hydrolysis instead of being added to the cooked extrudates before koji fermentation. The resulting corn gluten hydrolysed product also had a high glutamic acid content of 0.97% w/w. For organoleptic evaluation, 12.5 g of liquid sauce or 3.5 g of powder were diluted with 250 ml of boiling water. In both cases, a tasting panel of 8 experienced tasters found the product to have a better body than a product prepared without ading the technical hemicellulase enzyme to the hydrolysate.

Example 3

22.0 kg of water was heated to 35° C. in a reactor and 60 kg of corn gluten powder was added into the water with stirring. 380 g of technical protease enzyme, Flavorzyme 2.4L (commercially available from Novo Nordisk) was then added to the hydrolysate. The hydrolysate was also inoculated with *L. sake* culture to provide a count of $10^6$ cfu/ml. Temperature and pH were controlled at 35° C. and 6.0, respectively, for 48 hours. The hydrolyzed product produced this way was found to have a higher glutamic acid (0.4% w/w) compared to a product prepared without the inoculation of *L. sake* (0.2% w/w).

The hydrolysate was further processed as in example 1 to produce a corn gluten sauce powder. Better microbiological quality during hydrolysis was achieved compared to the product prepared without the inoculation of *L. sake*. A tasting panel of 8 experienced tasters found the product to have a better body than a product prepared without the addition of *L. sake*.

Example 4

A procedure similar to that carried out in example 3 was followed except that 380 g of technical protease enzyme, Flavorzyme 2.4 L (commercially available from Novo Nordisk) and 700 g of technical hemicellulase enzyme, Hemicellulase (activity=90,000 μ/g) (commercially available from Amano Pte Ltd.), was added to the hydrolysate at the onset of hydrolysis. The resulting corn gluten hydrolyzed product had a high glutamic acid content of 0.83% w/w. A tasting panel of 8 experienced tasters found the product to have a better body than a product prepared without the addition of the technical hemicellulase enzyme, i.e., a body that was even better than that of the product of example 3 due to the presence of further fiber hydrolyzing enzyme, hemicellulase, in addition to that derived from the *L. sake*.

Example 5

A procedure similar to that carried out in example 1 was followed except that the koji was based on wheat gluten instead of corn gluten and that the technical hemicellulase enzyme, Hemicellulase (activity=90,000 μ/g) (commercially available from Amano Pte Ltd.), was added to the hydrolysate at the onset of hydrolysis at a concentration of 0.25% of the weight of hydrolysate. Wheat gluten powder at a ratio of 7:3 relative to the wheat gluten koji was added to the hydrolysate during hydrolysis. The water quantity was adjusted so that the hydrolysate had a total solids content of 18% w/w.

The hydrolysed product was found to have a higher glutamic acid (2.10% w/w) and formol nitrogen (0.95% w/w) compared to the product prepared without the inoculation of the technical hemicellulase enzyme (1.76% w/w and 0.88% w/w, respectively). A tasting panel of 8 experienced tasters found the product to have a better body than a product prepared without the addition of the technical hemicellulase enzyme.

Example 6

A procedure similar to that carried out in example 5 was followed except that fiber hydrolyzing enzyme was not added, corn gluten powder was added in the hydrolysate instead of wheat gluten powder, and the ratio of koji to powder was 7:3 instead of 3:7. 380 g of the technical protease enzyme, Flavorzyme 2.4L (commercially available from Novo Nordisk) and 380 g of the technical protease enzyme, Alcalase 1.5L (commercially available from Novo Nordisk) were also added to the hydrolysate at the onset of hydrolysis. The resulting hydrolyzed product had a high glutamic acid content of 1.83% w/w. A tasting panel of 8 experienced tasters found the product to have a better body than a product prepared without the addition of the *L. sake* as the source of the fiber hydrolyzing enzyme.

Example 7

A procedure similar to that carried out in example 1 was followed except that the culture of *L. sake* was omitted. A tasting panel of 8 experienced tasters found the product to have a better body than a product prepared without the addition of the technical hemicellulase enzyme.

What is claimed is:

1. A process for producing a hydrolysate seasoning comprising;
   providing an aqueous solution of a protein koji prepared from a protein composition comprising one or more proteins and a carbohydrate;
   inoculating the protein koji with a culture of a lactic acid bacteria at an inoculation density of from $10^3$ to $10^9$ cfu/g of the koji; and
   hydrolyzing the protein koji with one or more enzymes that have proteolytic activity and one or more enzymes that have fiber hydrolyzing activity to produce a hydrolysate seasoning, wherein at least one of the enzymes used to hydrolyze the protein-containing material is a technical proteolytic enzyme or a technical fiber-hydrolyzing enzyme.

2. The process of claim 1, wherein the protein koji contains about 30 to 100 percent protein.

3. The process of claim 2, wherein the protein koji comprises one or more of soya, wheat germ, corn gluten, rice gluten, or wheat gluten.

4. The process of claim 1, wherein the protein koji is inoculated with material with a lactic acid bacterium selected form the group consisting of *L. sake, L. Brevis, L. casei, L. curvatus, L. pentosus, L. plantarum, L. pentosaceus,* and mixtures thereof.

5. The process of claim 1, wherein the hydrolysis is carried out at a temperature of about 15° C. to 37° C. for about 12 hr to 5 days.

6. The process of claim 5, wherein the hydrolysis is carried out at a temperature of about 37° C. to 55° C. for about 8 hr to 2 days.

7. The process of claim 1, wherein the protein koji is a fermented protein koji prepared by fermenting the protein composition with a culture comprising one or more of *Aspergillus oryzae* or *Aspergillus sojae.*

8. The process of claim 1, wherein the protein koji has been inoculated with the lactic acid bacteria culture before the protein koji is fermented or before the koji is hydrolyzed.

9. The process of claim 1, wherein the one or more enzymes that have proteolytic activity is obtained from bacteria, fungi, or yeast.

10. The process of claim 1, wherein the one or more enzymes that have proteolytic activity is one or more of a proteolytic enzyme produced during the koji fermentation or a proteolytic enzyme produced by the lactic acid bacteria that has been inoculated into the protein koji.

11. The process of claim 1, wherein the one or more enzymes containing fiber hydrolyzing activity is one or more of a fiber hydrolyzing enzyme produced during the koji fermentation, or a fiber hydrolyzing enzyme produced by the lactic acid bacteria that has been inoculated into the protein koji.

12. The process of claim 1, wherein the one or more enzymes having proteolytic activity comprise a technical proteolytic enzyme that is added to the protein koji before the protein koji is fermented.

13. The process of claim 1, wherein the one or more enzymes having fiber hydrolyzing activity comprise a technical fiber hydrolyzing enzyme that is added to the protein koji before the protein koji is fermented.

14. A process for producing a hydrolysate seasoning comprising:
   providing an aqueous solution of one or more protein-containing materials;
   inoculating the protein-containing material with a culture of a lactic acid bacteria at an inoculation density of from $10^3$ to $10^9$ cfu/g of said protein-containing material; hydrolyzing the one or more protein-containing materials with one or more enzymes that have proteolytic activity and one or more enzymes that have fiber hydrolyzing activity to produce a hydrolysate seasoning, wherein at least one of the enzymes used to hydrolyze the protein-containing material is a technical proteolytic enzyme or a technical fiber-hydrolyzing enzyme;
   pressing the hydrolysate seasoning to separate a liquid hydrolysate seasoning from a solid residue;
   concentrating the liquid hydrolysate seasoning to provide a concentrated hydrolysate seasoning; and
   drying the concentrated hydrolysate seasoning to provide a dried hydrolysate seasoning.

15. The process of claim 14, wherein hydrolysis of the protein-containing material is carried out at a temperature from about 20° to 65° C. and at a pH of about 4.5 to 10 for about 6 hours to 28 days.

16. The process of claim 14, wherein the hydrolysis of the protein-containing material is carried out with salt in an amount of up to 100% by weight based on the weight of the protein material.

17. The process of claim 14, wherein the liquid hydrolysate seasoning is pasteurized at a temperature of about 90° to 140° C. for a period of about 15 seconds to 30 minutes and then filtered prior to concentrating.

18. The process of claim 14, wherein the hydrolysis is carried out in the absence of salt and further comprising adding salt either before pressing or after pressing to provide a liquid hydrolysate seasoning having a salt content of less then 60% by weight based on the weight of dry matter.

19. The process of claim 14, further comprising milling the dried hydrolysate seasoning into a powder having a water content of less than about 2 percent.

20. The process of claim 14, wherein the protein-containing material is inoculated with material with a lactic acid bacterium selected form the group consisting of *L. sake, L. Brevis, L. casei, L. curvatus, L. pentosus, L. plantarum, L pentosaceus,* and mixtures thereof.

21. The process of claim 14, wherein the protein-containing material is a protein koji prepared from a protein composition comprising one or more proteins and a carbohydrate.

22. A process for producing a hydrolysate seasoning comprising:

provid ing an aqueous solution of one or more protein-containing materials;

inoculating the protein-containing material with a culture of a lactic acid bacteria at an inoculation density of from $10^3$ to $10^9$ cfu/g of said protein-containing material; and hydrolyzing the one or more protein-containing materials with one or more enzymes that have proteolytic activity and one or more enzymes that have fiber hydrolyzing activity to produce a hydrolysate seasoning, wherein the one or more protein-containing materials is a koji, and at least one of the enzymes used to hydrolyze the protein-containing material is a technical proteolytic enzyme or a technical fiber-hydrolyzing enzyme, and wherein the one or more enzymes that have proteolytic activity is one or more of a proteolytic enzyme produced during a koji fermentation or a proteolytic enzyme produced by the lactic acid bacteria that has been inoculated into the protein-containing material.

23. A process for producing a hydrolysate seasoning comprising:

providing an aqueous solution of one or more protein-containing materials;

inoculating the protein-containing material with a culture of a lactic acid bacteria at an inoculation density of from $10^3$ to $10^9$ cfu/g of said protein-containing material; and hydrolyzing the one or more protein-containing materials with one or more enzymes that have proteolytic activity and one or more enzymes that have fiber hydrolyzing activity to produce a hydrolysate seasoning, wherein at least one of the enzymes used to hydrolyze the protein-containing material is a technical proteolytic enzyme or a technical fiber-hydrolyzing enzyme, and wherein the one or more protein-containing materials is a koji, and the one or more enzymes containing fiber hydrolyzing activity is one or more of a fiber hydrolyzing enzyme produced during a koji fermentation, or a fiber hydrolyzing enzyme produced by the lactic acid bacteria that has been inoculated into the protein-containing material.

* * * * *